Oct. 15, 1940.    E. KREHER    2,217,686

WATER BOX

Filed Dec. 6, 1937

INVENTOR
ERNEST KREHER
BY
S. Tierney Jr.
ATTORNEY

Patented Oct. 15, 1940

2,217,686

UNITED STATES PATENT OFFICE 2,217,686

WATER BOX

Ernest Kreher, Tampa, Fla.

Application December 6, 1937, Serial No. 178,305

2 Claims. (Cl. 286—13)

An object of this invention is to provide a novel type of water box which provides a liquid seal for a power shaft and more especially for the drive shaft of a centrifugal pump. A main function of the box is to prevent the passage of air into the interior of the pump or other driven machine by having said box filled with water, oil or other suitable fluid.

A further object is to provide a novel form of stuffing box construction in which a novel type of gland construction is used to apply pressure to the packing material. This construction is such as to permit the main shaft bearing to be mounted in close proximity to the pump casing or shell.

Other and further objects of the invention will become apparent to those skilled in the art as the description thereof proceeds. For a better understanding of the invention, however, reference is made to the accompanying drawing taken in connection with the following description. Referring to the drawing, in which.

Figure 1:
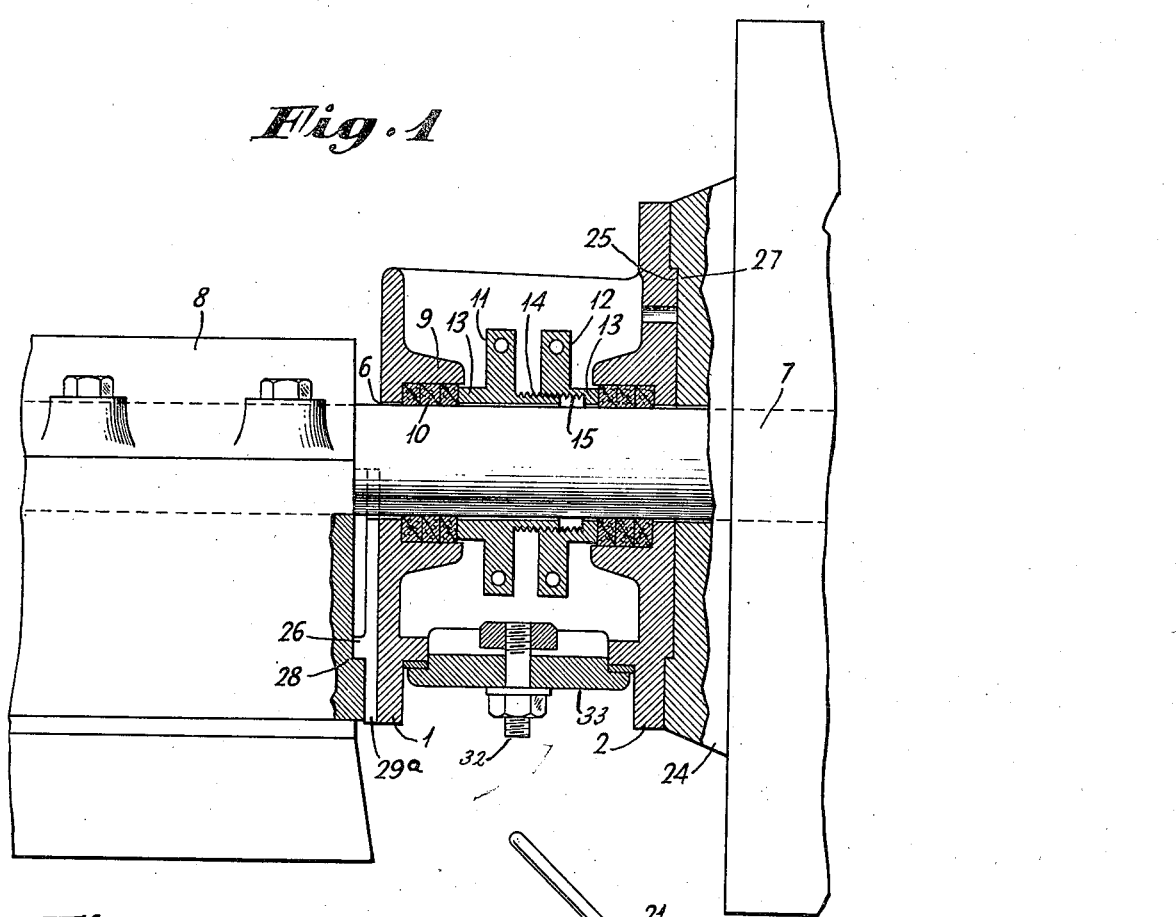
Fig. 1 is a cross sectional view of the water box taken through the power shaft and showing portions of the main shaft bearing and the pump casing or shell.
Figure 2:
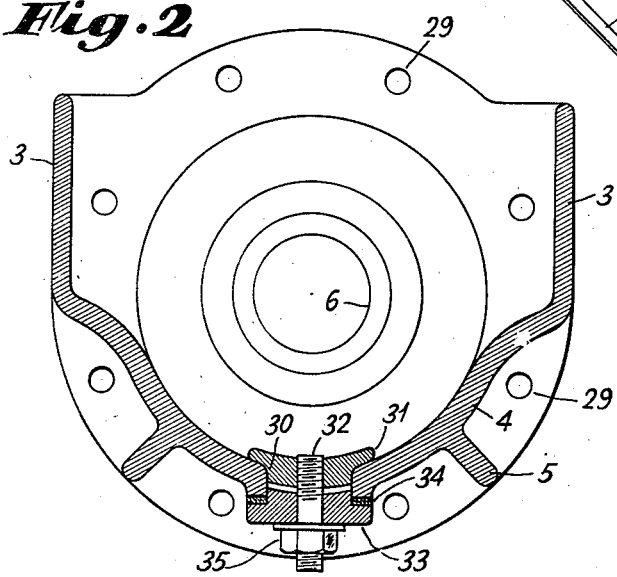
Fig. 2 is a sectional view taken through the center of the box at right angles with the shaft and, Fig. 3 is an end view of the stuffing box glands also showing the tool used for tightening them.
Figure 3:
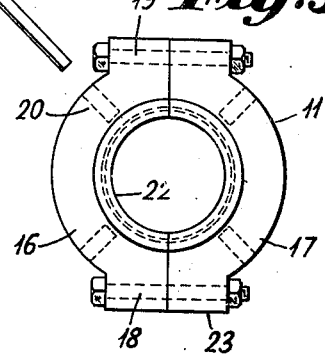

Referring to Figs. 1 and 2 my improved water box is shown as comprising two end walls 1 and 2 which are united by the two side walls or webs 3 and the curved or arc shaped bottom web 4 and the radial webs 5 which project outwardly from 4. These parts of the box may be made as a single casting of cast iron or other cast metal and form a hollow box which is water tight and open at the top. Each end wall is provided with a bored circular opening 6 slightly larger than the diameter of pump shaft 7 which passes through them from the main shaft bearing 8, the power being applied to 7 from an electric motor or pulley drive at the left end (not shown) of bearing 8 which forms the main support for the shaft. Each end wall is provided with an inwardly projecting boss 9 which is bored out to receive the three packing rings 10 which may be made of any known, resilient material used to effectively seal a joint. The rings shown are each formed in two similar, conical shaped parts meeting on their diagonal faces so that one section is forced inward against the shaft while the other is forced outward against the interior of boss 9 when they are compressed. Each ring is also cut radially in a known manner so that its two ends may be separated in order to slip it over the shaft.

It is one of the purposes of my invention to provide a novel arrangement for forming a sealed joint between the packing ring or rings, bosses 9 and shaft 7. For this purpose I provide two telescoping gland members 11 and 12 each of which has a circular bore 22 slightly larger than the shaft diameter. Each of these members has an annular projecting ring 13 at its outer end, the ends of which rings bear against the packing rings. At its right end member 11 is provided with a long annular flange which is exteriorly threaded as shown at 14 to engage the interiorly threaded bore 15 of gland 12. By rotating gland member 12 it is clear that the rings 13 will compress the packing rings 10 to form a sealed joint at each end of the box. My invention also provides means whereby glands 11 and 12 may be easily removed from the shaft and water box when they are screwed together, in which position the distance between the outer ends of rings 13 is less than that between the inner ends of the bosses 9.

Glands 11 and 12 are each made in two similar halves 16 and 17 which abut together in a plane passing through the shaft axis, and are provided with outwardly formed extensions 23 which are bored to receive the securing bolts 18 and 19 which hold the two halves of each gland together. Each gland is also provided with a plurality of radial holes 20 into which the end of a round tool shown as a rod 21 may be inserted. By inserting two such tools through the large opening at the top of the box into a hole in each gland, the glands may easily be screwed in or out without removing the water from the box and without the operator wetting his hands. It is also an object of my invention that a packing ring may be removed without removing the glands from the box. For this purpose it is only necessary to screw gland 12 fully onto gland 11 when the old ring may be removed and the new one inserted in the space between the end of boss 9 and ring 13.

In order to properly align the pump casing or shell, the left end wall of which is shown at 24 with the main bearing, the ends of the box have male extending portions 25, 26 which are accurately turned to the proper size to fit in corresponding female portions 27, 28 formed in the end walls of the pump casing and bearing. Each end wall of the box is also provided with a plurality of bolt holes 29 through which securing bolts are passed into aligned holes (not shown) in the member 24 and the lower half of the bearing, whereby the box is firmly bolted to the bearing block and pump shell. Should any water leak out of the bearing end of the box, in order to prevent this from getting into the bearing and doing harm, I preferably provide a slot 29a one and a half inches wide and cast into the end of wall 1 for a depth of one quarter inch. Any overflow will thus pass down through this slot and not enter the main bearing.

For the purpose of easily cleaning out the box, a clean out plate is provided to close a central opening 30 in the base of the box. This plate comprises an inner member having end flanges 31 which engage the inner surface of the box and into which a bolt 32 is screwed. This bolt carries a lower securing plate 33 between which and the lower face of the box a suitable resilient gasket 34 is compressed as by means of a nut 35. This construction provides a clean out plate which forms an effective sealed joint and at the same time may be easily removed in order to clean out the box.

While I have indicated and described an arrangement for carrying my invention into effect, it will be apparent to one skilled in the art that the invention is by no means limited to the particular organization shown and described, but that many modifications may be employed without departing from the scope of the invention as set forth in the appended claims.

I claim:

1. In a device of the class described, the combination of a centrifugal pump casing having a bore in one end wall thereof, a rotary shaft passing through said bore and means for preventing the passage of atmospheric air through said bore and into said casing due to suction within the pump casing, said means comprising a water box having a pair of end walls, a pair of side walls and a bottom wall connecting said end and side walls, said end walls being provided with inwardly projecting stuffing boxes each having a circular recess of substantially larger diameter than said shaft and through which said shaft passes, a plurality of packing rings in each of said recesses, a pair of gland members mounted between the stuffing boxes and having threaded engagement with each other and having their ends in contact with said packing rings, said water box containing a quantity of liquid at a level above the packing rings to thereby seal the bore in the pump casing.

2. A device as set forth in claim 1 in which the water box is open at the top and the opposite side walls are separated sufficiently to permit a tool having its lower end connected to one of said gland members to be rotated through a substantial angle.

ERNEST KREHER.